April 26, 1932. E. E. DAVIDSON 1,855,792
PACKING STRIP FOR AUTOMOBILES
Filed Sept. 23, 1931
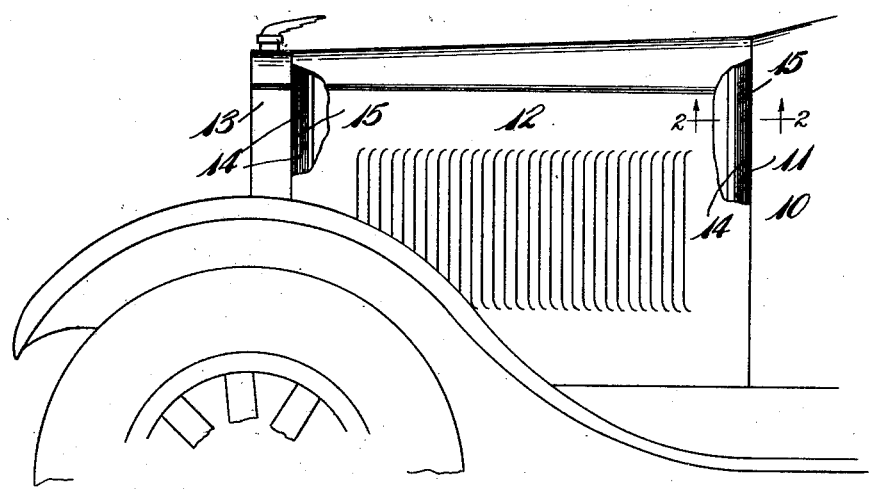
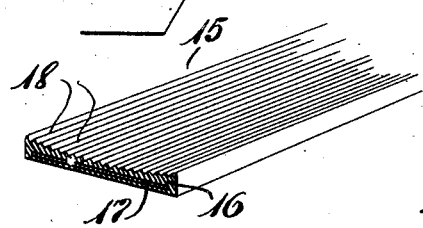
Inventor
Elias E. Davidson
By Eakin & Avery
Attys Patented Apr. 26, 1932

1,855,792

UNITED STATES PATENT OFFICE

ELIAS E. DAVIDSON, OF AKRON, OHIO, ASSIGNOR TO THE B. F. GOODRICH COMPANY, OF NEW YORK, N. Y., A CORPORATION OF NEW YORK

PACKING STRIP FOR AUTOMOBILES

Application filed September 23, 1931. Serial No. 564,594.

This invention relates to a packing strip adapted to be applied between the hood of an automobile and the radiator shell and body.

The principal objections of the invention are to provide a packing strip which will readily accommodate itself to the meeting parts, that may be securely fastened in place, and that will hold a lubricant.

Other objects will appear from the following description and accompanying drawings.

In the drawings:

Fig. 1 is a side elevation of the front portion of an automobile showing the packing strip in place, parts of the hood being broken away to show the packing strip.

Fig. 2 is a cross-sectional view on line 2—2 of Fig. 1, showing only a portion of the body and hood of the car.

Fig. 3 is a perspective view of the packing strip, one end being shown in section.

Referring to the drawings, the numeral 10 designates that portion of the body of an automobile generally known as the cowl. The cowl is provided ordinarily with a reduced shoulder 11 over which the hood 12 extends.

The radiator shell 13 is provided with a similar shoulder for the same reason.

The packing strip of my invention is applied over these shoulders and is fastened thereto by rivets 14. The strip, designated generally by the numeral 15, comprises a molded strip of heat and oil resisting rubber composition 16 provided with a layer of reinforcing material 17, such as fabric, fiber, or metal embedded therein. The exposed face of the strip is made laterally concave and is ribbed as at 18 to provide longitudinal riding surfaces of narrow lateral extent, those near the margins being more elevated due to the concave contour. This insures that the rivets 14 will be set at sufficient depth so that contact thereof with the hood is avoided as seen in Fig. 2.

By constructing the strip with a generally concave face and of oil-resistant rubber material I provide a space for the reception of grease or other lubricant to prevent squeaking of the hood.

The strip may be manufactured by the extrusion method or may be molded in suitable molds. The fabric or other reinforcement may be readily pierced where required to provide rivet holes as the strip is applied. Being made of flexible material the strip may be readily bent to conform to the shape of the adjoining surfaces and the ribbed face will readily accommodate itself to the hood so as to exclude water, and also effectively retains the lubricant in well distributed relation to the contacting surfaces.

I claim:

1. A packing strip adapted to be applied to an automobile beneath a margin of the hood, said strip comprising an elongate resilient body of vulcanized rubber, and a reinforcing member embedded therein, said strip having a concave hood-engaging surface for retaining a lubricant.

2. A packing strip as defined by claim 1, in which the body of the strip comprises a heat and oil resistant rubber compound.

3. A packing strip as defined by claim 1, in which the reinforcing member comprises a strip of substantially non-extensible material approximately coextensive with the rubber strip.

4. A packing strip as defined by claim 1, in which the strip is formed with a recessed outer face.

5. A packing strip adapted to be applied to an automobile beneath a margin of the hood, said strip comprising an elongate resilient body of vulcanized rubber formed with a recessed outer face adapted to retain a lubricant, and a reinforcing member embedded therein.

6. A packing strip adapted to be applied to an automobile beneath the margin of the hood, said strip comprising an elongate resilient body of oil and heat resisting vulcanized rubber, a reinforcing member embedded therein and adapted to be engaged by rivets passing therethrough whereby the strip is fastened to the underlying structure, said strip having a concave hood-engaging surface the margins of which extend above the rivets and define a lubricant retaining cavity.

In witness whereof I have hereunto set my hand this 12th day of September, 1931.

ELIAS E. DAVIDSON.